United States Patent
Sun

(10) Patent No.: US 9,323,319 B2
(45) Date of Patent: Apr. 26, 2016

(54) MULTIPROCESSOR SYSTEM AND METHOD OF SAVING ENERGY THEREIN

(75) Inventor: Wei Sun, Tokyo (JP)

(73) Assignee: NEC Corporation, Tokyo (JP)

(*) Notice: Subject to any disclaimer, the term of this patent is extended or adjusted under 35 U.S.C. 154(b) by 305 days.

(21) Appl. No.: 14/129,841

(22) PCT Filed: Jun. 29, 2011

(86) PCT No.: PCT/JP2011/003733
§ 371 (c)(1),
(2), (4) Date: Dec. 27, 2013

(87) PCT Pub. No.: WO2013/001576
PCT Pub. Date: Jan. 3, 2013

(65) Prior Publication Data
US 2014/0129864 A1    May 8, 2014

(51) Int. Cl.
*G06F 1/32* (2006.01)
*G06F 9/48* (2006.01)

(52) U.S. Cl.
CPC ............ *G06F 1/3287* (2013.01); *G06F 1/3206* (2013.01); *G06F 1/329* (2013.01); *G06F 9/4843* (2013.01); *G06F 9/4893* (2013.01); *G06F 2209/483* (2013.01); *Y02B 60/144* (2013.01); *Y02B 60/32* (2013.01)

(58) Field of Classification Search
CPC ..... G06F 1/3287; G06F 1/329; G06F 1/3206; G06F 9/4843; G06F 9/4893
See application file for complete search history.

(56) References Cited

U.S. PATENT DOCUMENTS

| 6,167,330 A * | 12/2000 | Linderman | G06F 11/3089 |
| | | | 700/295 |
| 6,195,765 B1 * | 2/2001 | Kislanko | G06F 11/3664 |
| | | | 703/22 |
| 6,877,087 B1 * | 4/2005 | Yamada | G06F 1/3203 |
| | | | 712/213 |
| 7,398,410 B2 * | 7/2008 | Lee | G06F 1/3203 |
| | | | 712/43 |

FOREIGN PATENT DOCUMENTS

| JP | 01-239665 A | 9/1989 |
| JP | 08-006681 A | 1/1996 |
| JP | 2000-298593 A | 10/2000 |
| JP | 2002-55731 A | 2/2002 |
| JP | 2003-337713 | 11/2003 |

OTHER PUBLICATIONS

Anna R. Karlin, et al. "Competititve Randomized Algorithms for Non-Uniform Problems", MIT, 2003, Chapter 33, pp. 301-309.
(Continued)

*Primary Examiner* — Stefan Stoynov
(74) *Attorney, Agent, or Firm* — Wilmer Cutler Pickering Hale and Dorr LLP

(57) ABSTRACT

A multiprocessor system comprises: a plurality of processors; a counting, measuring and calculating (CMC) unit that determines a generating rate of sleep tasks and a time length of each of the sleep tasks based on an acceptable delay; a sleep task generator that generates the sleep tasks with the time length at the generating rate, and injects the generated sleep tasks into a traffic for original tasks; and a scheduler that assigns both the original tasks and the sleep tasks in the traffic to the plurality of processors, wherein each of the sleep tasks switches off one of the plurality of processors, on which the sleep task is assigned.

18 Claims, 5 Drawing Sheets

(56) References Cited

OTHER PUBLICATIONS

Chi-Hong Hwang, et al. "A Predictive System Shutdown Method for Energy Saving of Event-Driven Computation", IEEE, 1997, 5 pages.
Dinesh Ramanathan, et al. "System Level Online Power Management Algorithms", Center for Embedded Computer Systems, 2000, 6 pages.
Luca Benini, et al. "Policy Optimization for Dynamic Power Management", IEEE Transactions on Computer-Aided Design of Integrated Circuits and Systems, vol. 18, No. 6, Jun. 1999, pp. 813-833.
Mani B. Srivastava, et al. "Predictive System Shutdown and Other Architectural Techniques for Energy Efficient Programmable Computation", IEEE Transactions on Very Large Scale Intergration Systems, vol. 4, No. Mar. 1996, pp. 42-55.
Qinru Qiu, et al. "Dymanic Power Management Based on Continuous-Time Markov Decision Processes", University of South California, 1999, 7 pages.
Tajana Simunic "Dynamic Management of Power Consumption" HP Labs, Kluwer Academic Publishers, Jan. 2002, pp. 1-24.
International Search Report corresponding to International Application No. PCT/JP2011/003733, Sep. 15, 2011, 1 page.

* cited by examiner

MULTIPROCESSOR SYSTEM AND METHOD OF SAVING ENERGY THEREIN

CROSS-REFERENCE TO RELATED APPLICATIONS

This application is a national stage application of International Application No. PCT/JP2011/003733 entitled "Multiprocessor System and Method of Saving Energy Therein," filed on Jun. 29, 2011, the disclosures of which are hereby incorporated by reference in their entirety.

TECHNICAL FIELD

The present invention relates to a multiprocessor system and a method of saving energy in a multiprocessor system, and more especially to a multiprocessor system with plural local queues (distributed queue architecture) or with a global queue (global queue architecture).

BACKGROUND

Power and energy consumption has become a serious problem in recent years. It is critical to battery-supported electronic devices, affordable datacenters, and low carbon environments. Dynamic power management (DPM), one of the main approaches of power saving, aims at reducing the power consumption at the system level by selectively placing components into low-power states.

NPL 2:
A. Karlin, M. Manesse, L. McGeoch, and S. Owicki, "Competitive Randomized Algorithms for Nonuniform Problems," Algorithmca, pp. 542-571, 1994.

NPL 3:
D. Ramanathan, R. Gupta, "System Level Online Power Management Algorithms," Design, Automation and Test in Europe, pp. 606-611, 2000.

NPL 4:
C-H. Hwang and A. Wu, "A Predicative System Shutdown Method for Energy Saving of Event-Driven Computation," International Conference on Computer Aided Design, pp. 28-32, 1997.

NPL 5:
M. Srivastava, A. Chandrakasan, R. Brodersen, "Predicative System Shutdown and Other Architectural Techniques for Energy Efficient Programmable Computation," IEEE Transactions on VLSI Systems, vol. 4, no. 1, pp. 42-55, March 1996.

NPL 6:
L. Benini, G. Paleologo, A. Bogliolo, and G. De Micheli, "Policy Optimization for Dynamic Power Management," IEEE Transactions on Computer-Aided Design, vol. 18, no. 6, pp. 813-833, June 1999.

NPL 7:
Q. Qiu and M. Pedram, "Dynamic Power Management Based on Continuous-Time Markov Decision Processes," Design Automation Conference, pp. 555-561, 1999.

NPL 8:
T. Simunic, "Dynamic Management of Power Consumption," Power Aware Computing edited by R. Graybill and R. Melhem, 2002.

SUMMARY

The entire disclosures of the above Non-Patent Literatures (NPLs) are incorporated herein by reference thereto. The following analyses are given from a viewpoint of the present invention.

Although low-power states cost minimum energy, the transitions between states require extra time and energy. Thus, sophisticated power management policies at system level are necessary to well make use of the DPM and otherwise both performance and efficiency will deteriorate.

The most common power management policy at system level is the timeout policy (NPLs 2 and 3) implemented in most operating systems. The drawback of this policy is that power and energy is wasted while waiting of timeout events.

Predictive policies (NPLs 4 and 5) developed for interactive terminals force the transition to a low power state as soon as a component becomes idle if the predictor estimates that the idle period will last long enough. Obviously incorrect estimates can cause both performance and energy penalties.

The policies based on stochastic models can guarantee optimal results. Stochastic models use distributions to describe system behaviors (NPLs 6-8). In other words, the accuracy and the optimality heavily depend on whether system behaviors meet the distributions. For example, inter-arrival times and execution times may not follow exponential distributions, which are assumed in all Markovian models. Moreover, most stochastic policies are stationary (the same policy applies at any point in time).

Therefore, there is a need in the art to provide a multiprocessor system and a method of saving energy consumption in a multiprocessor system, with which power consumption is reduced and the average response time of tasks can be controlled.

According to a first aspect of the present invention, there is provided a multiprocessor system comprising:
a plurality of processors;
a counting, measuring and calculating (CMC) unit that determines a generating rate of sleep tasks and a time length of each of the sleep tasks based on an acceptable delay;
a sleep task generator that generates the sleep tasks with the time length at the generating rate, and injects the generated sleep tasks into a traffic of original tasks; and
a scheduler that assigns both the original tasks and the sleep tasks in the traffic to the plurality of processors, wherein
each of the sleep tasks switches off one of the plurality of processors, on which the sleep task is assigned.

According to a second aspect of the present invention, there is provided a method of saving energy in a multiprocessor system, comprising:
determining a generating rate of sleep tasks and a time length of each of the sleep tasks based on an acceptable delay;
generating the sleep tasks with the time length at the generating rate;
injecting the generated sleep tasks into a traffic of original tasks; and
assigning both the original tasks and the sleep tasks in the traffic to a plurality of processors, wherein
each of the sleep tasks switches off one of the plurality of processors, on which the sleep task is assigned.

According to a further aspect, there is provided a program for implementing the method or driving/executing the multiprocessor system according to the aspects aforementioned. The program may be recorded on a computer-readable non-transient medium which may result in a program product.

The present invention provides the following advantage, but not restricted thereto. According to a multiprocessor system and a method of saving energy in a multiprocessor of the present invention, power consumption in the multiprocessor system can be reduced and the average response time of tasks can be controlled.

PREFERRED MODES

In the present disclosure, there are various possible modes, which include the following, but not restricted thereto. The following terms are used in the description.

1. State "On": an active state in which processors run in full speed
2. State "Off": an low-power state in which processors may sleep fully or run in low speed
3. Transfer: state transfer from "On" to "Off" or "Off" to "On"
4. Transfer time: the time needed by the state transfer
5. Transfer energy: the energy needed by the state transfer
6. Task: an amount of computations Note that only medium or heavy task traffic is considered in the present invention, because it is trivial to deal with light traffic.

In a multiprocessor system, tasks arrive at and depart from a central scheduler. Basically such a system can be approximately represented by queuing models and the performance in equilibrium is concerned.

In a multiprocessor system according to the present invention, power management is performed, which can reduce energy consumption through smartly switching some processors off in the multiprocessor system. The present invention aims at properly switching off some processors, i.e., having some processors in the state "off", in order to save power consumption and meanwhile the average response time of tasks should be in control. The state transfer frequency is kept low, because the extra time and energy are needed in the state transfer.

In the multiprocessor system according to the present invention, sleep tasks, namely, virtual tasks which do nothing but merely switch processors off, are created and injected into the original task traffic. The following two steps are performed in the multiprocessor system. First, the amount of sleep tasks within a period of time is decided in terms of a queuing model. Second, the injected sleep tasks are appropriately assigned to processors without greatly increasing the response time of original tasks and with avoiding frequent state transfer.

Figure 1:
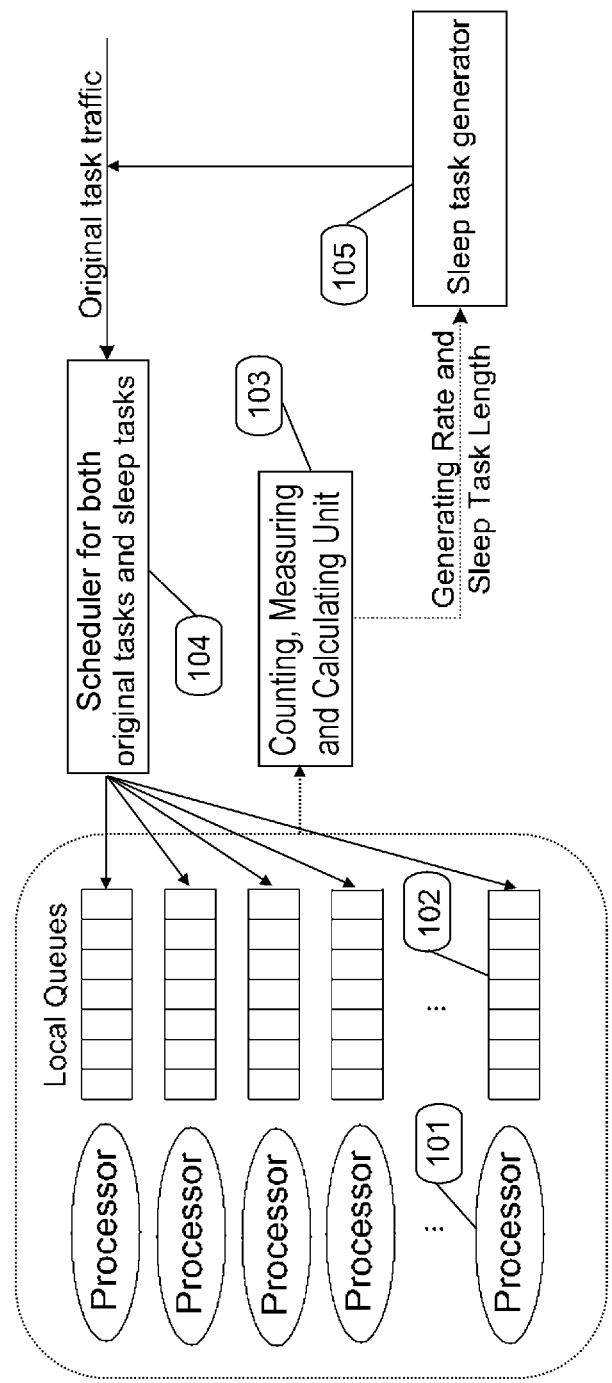
FIG. 1 is a block diagram illustrating a multiprocessor system in a distributed queue architecture according to an exemplary embodiment.
Figure 2:
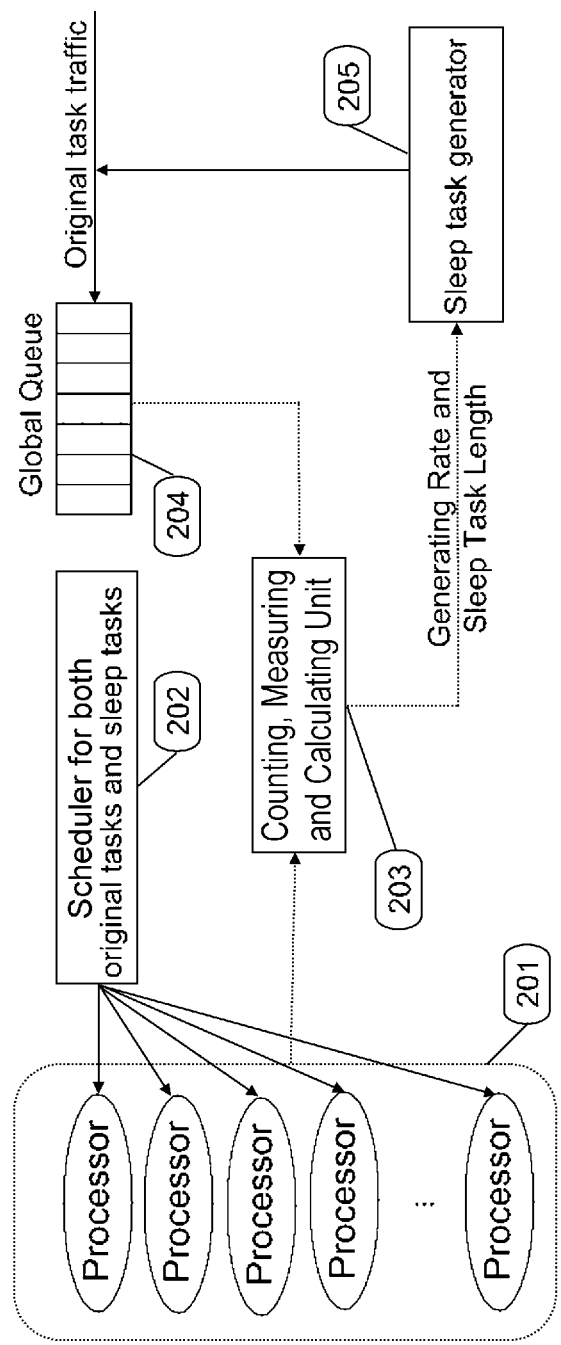
FIG. 2 is a block diagram illustrating a multiprocessor system in a global queue architecture according to the exemplary embodiment.

Here, an overview of the present invention is described. The reference numerals added here are merely to help understanding the description. Note that the present invention is not limited to the mode shown in the figures. With reference to FIGS. 1 and 2, the multiprocessor system according to the present invention comprises: a plurality of processors (101, 201); a counting, measuring and calculating (CMC) unit (103, 203) that determines a generating rate of sleep tasks and a time length of each of the sleep tasks based on an acceptable delay; a sleep task generator (105, 205) that generates, at the generating rate, the sleep tasks with the time length, and injects the generated sleep tasks into a traffic of original tasks; and a scheduler (104, 202) that assigns both the original tasks and the sleep tasks in the traffic to the plurality of processors, wherein each of the sleep tasks switches off one of the plurality of processors, on which the sleep task is assigned.

According to a multiprocessor system of the present invention, power consumption in the multiprocessor system can be reduced and the average response time of tasks can be controlled.

In the present disclosure, there are various possible modes, which include the following, but not restricted thereto.

(Mode 1)
There is provided a multiprocessor system according to the first aspect of the present invention.

(Mode 2)
In the multiprocessor system, the CMC unit may determine the generating rate and the time length so that inter-arrival times and execution times of both the original tasks and the sleep tasks follow predetermined distributions for the queuing model.

(Mode 3)
In the multiprocessor system, the CMC unit may determine the acceptable delay in accordance with an average response time of the original tasks.

(Mode 4)
In the multiprocessor system, the scheduler may try to reduce transitions of the plurality of processors between an on state and an off state.

(Mode 5)
In the multiprocessor system, the sleep tasks may be a virtual task that does nothing but only switches off one of the plurality of processors, on which the task is assigned; and the sleep tasks may have the same statistics as the original tasks.

(Mode 6)
The multiprocessor system may further comprise a plurality of local queues, each of which holds at least a part of the original tasks and the sleep tasks.

(Mode 7)
In the multiprocessor system, if there is an empty processor in the plurality of processors, the scheduler may send a new task to the empty processor; and if there is no empty processor in the plurality of processors, the scheduler may send the new task to one of the plurality of local queues, in which the last task is of the same type with the new task.

(Mode 8)
The multiprocessor system may alternatively comprise a global queue that holds the original tasks and the sleep tasks.

(Mode 9)
In the multiprocessor system, if a task is finished in one of the plurality of processors, the scheduler may send to the processor the earliest task of the same type in the global queue.

(Mode 10)
In the multiprocessor system, the CMC unit may measure execution time of finished original tasks, count the number of the original tasks and calculate an arrival rate and a distribution of the original tasks within a period of time.

(Mode 11)
In the multiprocessor system, the CMC unit may determine the generating rate so that the inter-arrival time of both the original tasks and the sleep tasks to follow a predetermined distribution.

(Mode 12)

In the multiprocessor system, the CMC unit may determine the generating rate of the sleep tasks in accordance with a measurement result of an arrival rate of the original tasks.

(Mode 13)

In the multiprocessor system, the CMC unit may determine the time length of the sleep tasks in accordance with a measurement result of the recently finished tasks.

(Mode 14)

There is provided a method of saving energy in a multiprocessor system according to the second aspect of the present invention.

(Mode 15)

In the method of saving energy in a multiprocessor system, the generating rate and the time length may be determined so that inter-arrival times and execution times of both the original tasks and the sleep tasks follow predetermined distributions for the queuing model.

(Mode 16)

The method of saving energy in a multiprocessor system may further comprise determining the acceptable delay in accordance with an average response time of the original tasks.

(Mode 17)

The method of saving energy in a multiprocessor system may further comprise trying to reduce transitions of the plurality of processors between an on state and an off state.

(Mode 18)

In the method of saving energy in a multiprocessor system, the sleep tasks may be a virtual task that does nothing but only switches off one of the plurality of processors, on which the task is assigned; and the sleep tasks may have the same statistics as the original tasks.

(Mode 19)

There is provided a program for implementing the method or driving/executing the multi-processor system according to the modes aforementioned. The program may be recorded on a computer-readable non-transient medium which may result in a program product. The program may be used at least partly implementing the steps of the method or operating the elements of the system.

Exemplary Embodiment

A multiprocessor-system according to an exemplary embodiment is described with reference to the drawings.

FIG. 1 is a block diagram illustrating a multiprocessor system in a distributed queue architecture. With reference to FIG. 1, the multiprocessor system comprises a plurality of processors 101, a plurality of local queues 102, a counting, measuring and calculating (CMC) unit 103, a sleep task generator 105 and a scheduler 104. The CMC unit 103 determines a generating rate of sleep tasks and a time length of each of the sleep tasks. The sleep task generator 105 generates sleep tasks with the time length at the generating rate, and injects the generated sleep tasks into a traffic of original tasks. The scheduler 104 assigns both the original tasks and the sleep tasks in the traffic to the local queues 102.

FIG. 2 is a block diagram illustrating a multiprocessor system in a global queue architecture. With reference to FIG. 2, the multiprocessor system comprises a plurality of processors 201, a global queue 204, a counting, measuring and calculating (CMC) unit 203, a sleep task generator 205 and a scheduler 202. The CMC unit 203 determines a generating rate of sleep tasks and a time length of each of the sleep tasks. The sleep task generator 205 generates, at the generating rate, sleep tasks with the time length, and injects the generated sleep tasks into a traffic of original tasks. The scheduler 202 assigns both the original tasks and the sleep tasks in the global queue 204 to the processors 201.

The architecture of the conventional system software must be changed slightly. Two designs, i.e., distributed queue architecture (FIG. 1) and global queue architecture (FIG. 2), are provided in the present exemplary embodiment. At least two components are added to the conventional architectures. One is a sleep task generator (105 in FIG. 1, 205 in FIG. 2) and the other is a measuring and computing component, i.e., a counting, measuring and calculating (CMC) unit (103 in FIG. 1, 203 in FIG. 2). Moreover, the scheduler (104 in FIG. 1, 202 in FIG. 2) should also be enhanced to well deal with both original tasks and sleep tasks. FIGS. 1 and 2 show the two kinds of architecture. In FIGS. 1 and 2, the solid lines denote the task path, and the dashed lines denote the information collection path.

The multiprocessor system illustrated in FIGS. 1 and 2 operate as described in the following.

Step 1. The CMC units 103 and 203 calculate average response time of tasks according to a queuing model. For an application and the system, a queuing model can be established. For a long run application, such like a web system or a network switch, the equilibrium must exist and the calculation can be done.

Step 2. The CMC units 103 and 203 set an acceptable delay to the average response time of original tasks, and then according to the model in the first step the new arrival rate of tasks is obtained.

Step 3. The CMC units 103 and 203 count the number of tasks arriving at the system within a period of time and measure the execution times of the finished tasks within the same period of time (step S501 in FIG. 5). The time period is called the time window. In the distributed queue architecture, the CMC unit 103 monitors both the processors 101 and the local queues 102. In the global queue architecture, the CMC unit 203 monitors both the processors 201 and the global queue 204.

Step 4. According to the new arrival rate from Step 2 and the data from Step 3, the CMC units 103 and 203 calculate the generating rate and decide the time lengths of generated sleep tasks (steps S502 to S505 in FIG. 5). An example of the calculation is based on a cluster of M/M/1, because only medium or heavy load is considered in the present invention and for heavy load a cluster of m processors, each M/M/1, is almost equal to a system of M/M/m. Assuming that the arrival rate of original tasks is known to be L1, the average response time of tasks should be $1/(u-(L1/m))$. Here, u is the service rate of processors. If the delay of a factor d is allowed and the new arrival rate is L, following equation holds. $d/(u-(L1/m)) =1/(u-(L/m))$. Thus, L can be calculated. The arrival rate of sleep tasks is denoted as L2. Then, $L2=L-L1$. The execution times of original tasks may not follow an exponential distribution. Thus, the lengths of sleep tasks will be created to fill this gap. That is, the execution times of both original tasks and sleep tasks are finally forced to follow an exponential distribution. Moreover, the arrival intervals of tasks are also forced to follow a certain exponential distribution through adjusting injection time of sleep tasks.

Step 5. The sleep task generators 105 and 205 inject the generated sleep tasks into the original task traffic (step S506 in FIG. 5). Then, the traffic of tasks w HI be regulated to meet the previously established model.

Figure 3:
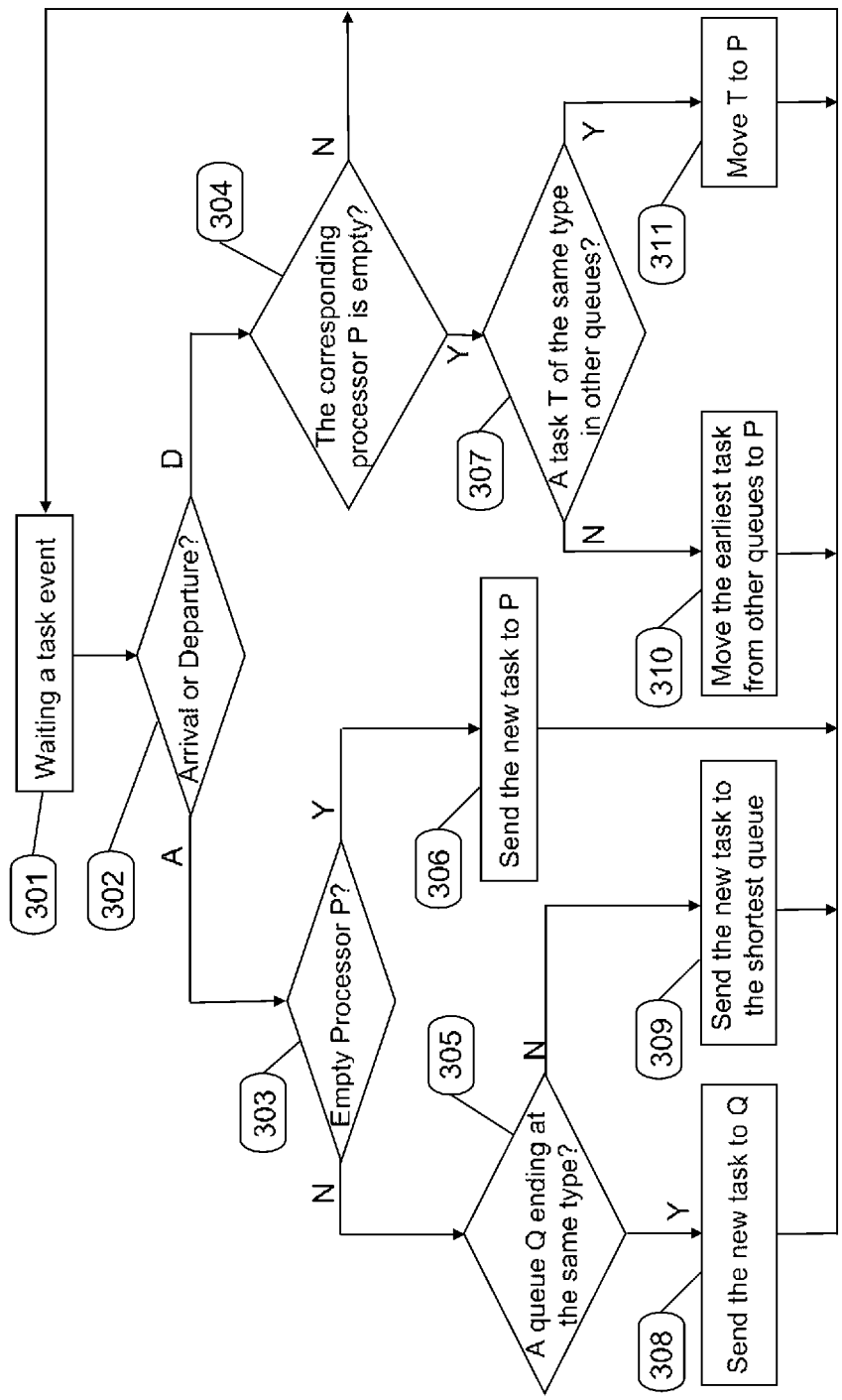
FIG. 3 is a flow chart illustrating an operation of a scheduler for distributed queue architecture in the exemplary embodiment.
Figure 4:
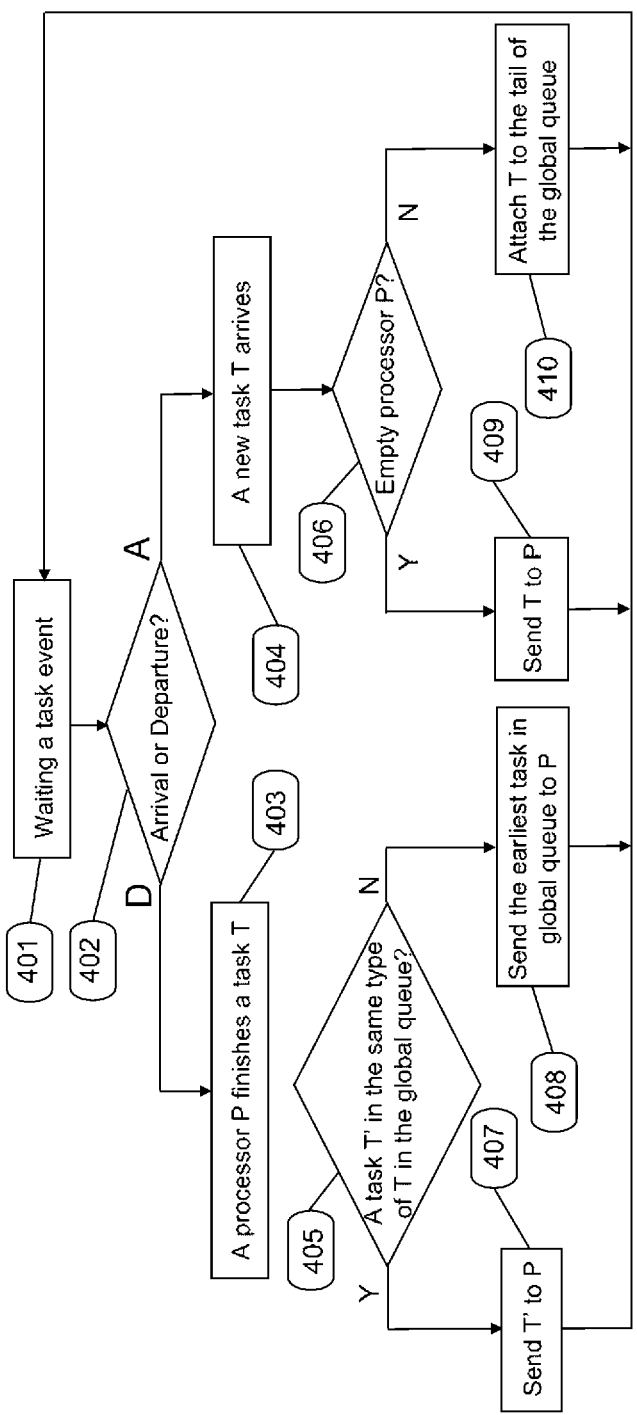
FIG. 4 is a flow chart illustrating an operation of a scheduler for global queue architecture in the exemplary embodiment.

Step 6. The schedulers 104 and 202 assign the original tasks and the sleep tasks in terms of a certain scheduling algorithm. Two scheduling algorithms, FIG. 3 and FIG. 4, are provided in the present exemplary embodiment, respectively, for the distributed queue architecture and the global queue architecture. Both the two scheduling algorithms aim at avoiding unnecessary state transfers.

A variant of the scheduling algorithms exists. In such a variant, a parameter is defined to be the latest time in which the processor state can be changed. In other words, the parameter defines the longest time in which a processor stays in the same state.

In the following, the present exemplary embodiment is described in more detail.

1. The queuing model could be any one from which the average response time can be modeled. However, with respect to the complexity of computation, a cluster of M/M/1 is chosen because first a cluster of M/M/1 queues is equivalent to an M/M/m queuing system, second the injection of sleep tasks can force the arrival intervals and execution time of tasks to follow a certain exponential distribution. The computation based on a cluster of M/M/1 queues is much simpler than others.

2. The average response time of the original systems and applications is assumed to be known beforehand. If the original average response time is unknown, a series of measurements should be done to fit the models and compute the average response time.

3. In the distributed queue architecture in FIG. 1, the CMC unit 103 keeps monitoring the processors 101 and the local queues 102 to count the number of tasks in the systems and the execution times of tasks. In the global queue architecture in FIG. 2, the CMC unit 203 keeps monitoring the processors 201 and the global queue 204. A time period, a window, is set. The number of tasks within the window and the execution times of tasks are used to compute the arrival rate and the average execution time of tasks, which will be used in deciding the rate of generating sleep tasks and the time lengths of sleep tasks. As time goes on, the window is also moved to catch up with the current time.

4. The schedulers 104 and 202 treat the injected tasks in the same manner as the original tasks. In each processor, if the previously finished task is a sleep task, the processor will still be in "off" state until an original task arrives, and vice versa.

5. The sleep task generators 105 and 205 calculate the generating time and the time length of the next sleep task in terms of the results from the CMC units 103 and 203.

6. The scheduling algorithms for distributed queue architecture and global queue architecture are instanced, respectively, in FIGS. 3 and 4.

(1) Both of the two algorithms are event-driven. An event trigger is built in the algorithms, i.e., steps S301 and S401.

(2) Two kinds of events are recognized in steps S302 and S402 to decide the following behaviors of the algorithms.

(3) For distributed queue architecture, whether a processor is going to be empty is the key to decide task assignment as in steps S303 and S304.

(4) The algorithms always try to send the earliest tasks to empty processors such like in steps S306, S310, S408, and S409.

(5) The algorithms always try to send the tasks of the same type as the previously finished ones to avoid unnecessary state transfer such as in steps S308, S311, and S407.

(6) The algorithm for distributed queue architecture tries to maintain a certain load balancing such as in steps S308 and S309.

With reference to FIG. 3, in the distributed queue architecture, the scheduler 104 waits a task event step S301). If a new task arrives (A in step S302), the scheduler 104 determines whether a processor P is empty or not (step S303). If the processor P is empty (Y in step S303), the scheduler 104 sends the new task to the processor P (step S306). If the processor P is not empty (N in step S303), the scheduler 104 determines whether the last task in a queue Q is of the same type with the new task (step S305). If the last task in the queue Q is of the same type with the new task (Y in step S305), the scheduler 104 sends the new task to the queue Q (step S308). If the last task in the queue Q is not of the same type with the new task (N in step S305), the scheduler 104 sends the new task to the shortest queue (step S309).

If a task departs from a processor P (D in step S302), the scheduler 104 determines whether the processor P is empty or not (step S304). If the processor P is empty (Y in step S304), the scheduler 104 determines whether there is a task T of the same type with the departing task in other queues (step S307). If there is the task T (Y in step S307), the scheduler 104 moves the task T to the processor P (step S311). If there in not the task T (N in step S307), the scheduler moves the earliest task from other queues to the processor P (step S310).

With reference to FIG. 4, in the global queue architecture, the scheduler 202 waits a task event (step S401). If a task T departs (D in step S402), i.e., a processor P finishes a task T (step S403), the scheduler 202 determines whether there is a task T' of the same type with the task T in the global queue 204 (step S405). If there is the task T' (Y in step S405), the scheduler 202 sends the task T' to the processor P (step S407). If there is not the task T' (N in step S405), the scheduler 202 sends the earliest task. in the global queue 204 to the processor P (step S408).

If a new task T arrives (A in step S402, S404), i.e., the scheduler 202 determines whether a processor P is empty or not (step S406). If the processor P is empty (Y in step S406), the scheduler 202 sends the task T to the processor P (step S409). If the processor P is not empty (N in step S406), the scheduler 202 attaches the task T to the tail of the global queue 204 (step S410).

Figure 5:
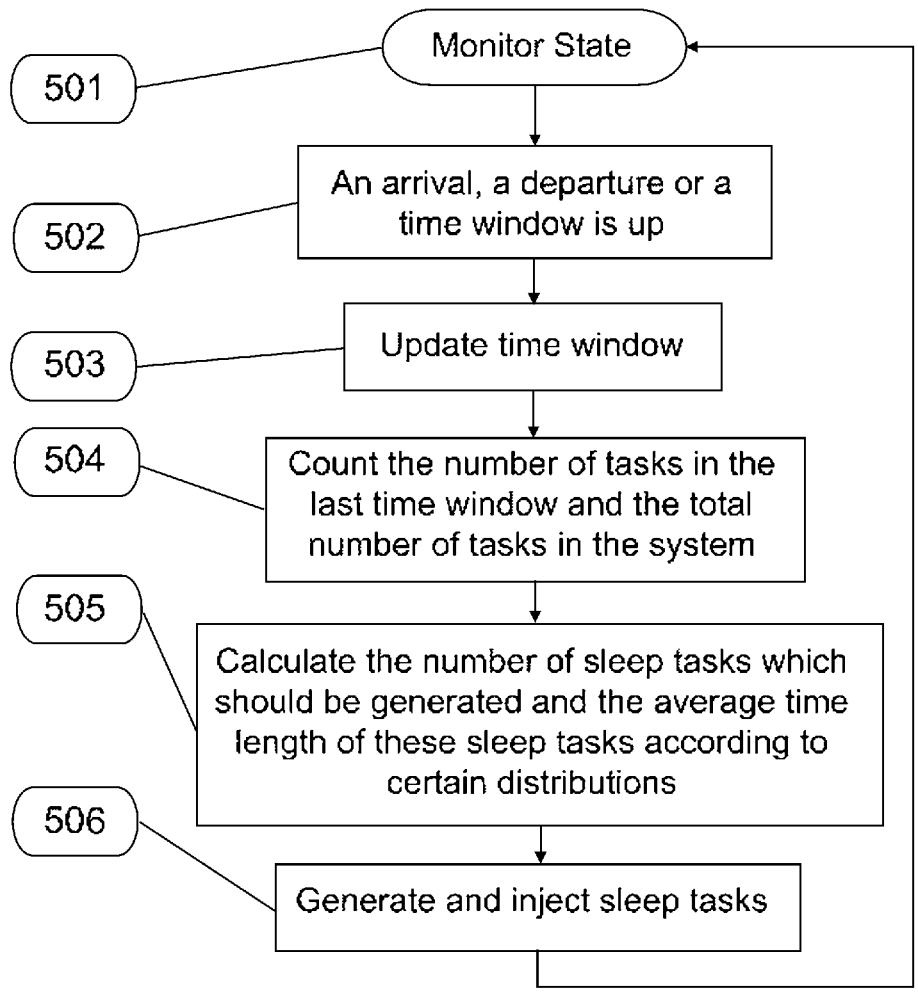
FIG. 5 is a flow chat illustrating an operation of a CMC unit and a sleep task generator in the exemplary embodiment.

7. The mechanism of generating and injecting sleep tasks is shown in FIG. 5. The CMC units 103 and 203 performs from step S501 to step S504, while the sleep task generators 105 and 205 perform step S505.

One of the differences of the present invention from the conventional techniques is that the amount of the time of switching processors off is decided in advance and then the time slots, the sleep tasks, are co-scheduled along with the original tasks. In the conventional techniques, when and how long to switch processor off is decided at the current time instant.

The advantageous effects of the exemplary embodiment are summarized in the following, but not restricted thereto.

1. The multiprocessor system according to the present exemplary embodiment is more reliable than the conventional techniques, because generation of sleep tasks will force the arrival rate and the execution time of all tasks to meet the selected queuing model, no matter which model is considered. Thus, the calculation based on the model must be more accurate. In other words, the average response time of all tasks can be known accurately.

2. The multiprocessor system according to the present exemplary embodiment is simpler than the other conventional systems. The calculation is based on a selected queuing model and there is no need to adopt more complex calculations. The extra operations, such as generating sleep tasks and scheduling the sleep tasks, are not difficult to implement.

3. The scheduling of tasks tries to combine sleep tasks to run together, and thus to avoid unnecessary state transfer.

Variations and adjustments of the exemplary embodiment are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

101 processor(s)
102 local queues
103 counting, measuring, and calculating (CMC) unit
104 scheduler
105 sleep task generator
201 processor(s)
202 scheduler
203 counting, measuring, and calculating (CMC) unit
204 global queue
205 sleep task generator

What is claimed is:

1. A multiprocessor system comprising:
a plurality of processors;
a counting, measuring and calculating (CMC) unit that determines a generating rate of sleep tasks and a time length of each of the sleep tasks based on an acceptable delay;
    a sleep task generator that generates the sleep tasks with the time length at the generating rate, and injects the generated sleep tasks into a traffic for original tasks; and
    a scheduler that assigns both the original tasks and the sleep tasks in the traffic to the plurality of processors, wherein each of the sleep tasks switches off one of the plurality of processors, on which the sleep task is assigned.

2. The multiprocessor system according to claim 1, wherein the CMC unit determines the generating rate and the time length so that inter-arrival times and execution times of both the original tasks and the sleep tasks follow predetermined distributions for a queuing model.

3. A multiprocessor system according to claim 1, wherein the CMC unit determines the acceptable delay in accordance with an average response time of the original tasks.

4. The multiprocessor system according to claim 1, wherein the scheduler tries to reduce transitions of the plurality of processors between an on state and an off state.

5. The multiprocessor system according to claim 1, wherein the sleep tasks are virtual tasks that do nothing but switch off one of the plurality of processors, on which the sleep task is assigned; and
    the sleep tasks have the same statistics as the original tasks.

6. The multiprocessor system according to claim 1, further comprising a plurality of local queues, each local queue holds at least part of the original tasks and the sleep tasks.

7. The multiprocessor system according to claim 6, wherein, if there is an empty processor in the plurality of processors, the scheduler sends a new task to the empty processor; and if there is no empty processor in the plurality of processors, the scheduler sends the new task to one of the plurality of local queues, in which the last task is of the same type with the new task.

8. The multiprocessor system according to claim 1, further comprising a global queue that holds the original tasks and the sleep tasks.

9. The multiprocessor system according to claim 8, wherein, if a task is finished in one of the plurality of processors, the scheduler sends to the processor the earliest task of the same type in the global queue.

10. The multiprocessor system according to claim 1, wherein the CMC unit measures execution time of finished original tasks, counts the number of the original tasks and calculates an arrival rate and a distribution of the original tasks within a period of time.

11. The multiprocessor system according to claim 1, wherein the CMC unit determines the generating rate so that the inter-arrival time of both the original tasks and the sleep tasks to follow a predetermined distribution.

12. The multiprocessor system according to any claim 1, wherein the CMC unit determines the generating rate of the sleep tasks in accordance with a measurement result of an arrival rate of the original tasks.

13. The multiprocessor system according to claim 1, wherein the CMC unit determines the time length of the sleep tasks in accordance with a measurement result of the recently finished tasks.

14. A method of saving energy in a multiprocessor system comprising:
    determining a generating rate of sleep tasks and a time length of each of the sleep tasks based on an acceptable delay;
        generating the sleep tasks with the time length at the generating rate;
        injecting the generated sleep tasks into a traffic for original tasks; and
        assigning both the original tasks and the sleep tasks in the traffic to a plurality of processors, wherein
        each of the sleep tasks switches off one of the plurality of processors, on which the sleep task is assigned.

15. The method of saving energy in a multiprocessor system according to claim 14, wherein the generating rate and the time length are determined so that inter-arrival times and execution times of both the original tasks and the sleep tasks follow predetermined distributions for a queuing model.

16. The method of saving energy in a multiprocessor system according to claim 14, further comprising determining the acceptable delay in accordance with an average response time of the original tasks.

17. The method of saving energy in a multiprocessor system according to claim 14, further comprising trying to reduce transitions of the plurality of processors between an on state and an off state.

18. The method of saving energy in a multiprocessor system according to claim 14, wherein the sleep tasks are virtual tasks that do nothing but switch off one of the plurality of processors, on which the sleep task is assigned; and
    the sleep tasks have the same statistics as the original tasks.

* * * * *